May 8, 1962 H. A. BLEAM 3,034,062

DELAY LINE CIRCUITS

Filed Sept. 13, 1956 3 Sheets-Sheet 1

INVENTOR.
Howard A. Bleam
BY Donald W. Phillion
HIS ATTORNEY

May 8, 1962 H. A. BLEAM 3,034,062

DELAY LINE CIRCUITS

Filed Sept. 13, 1956 3 Sheets-Sheet 2

INVENTOR.
Howard A. Bleam

BY Donald W. Phillion

HIS ATTORNEY

May 8, 1962 H. A. BLEAM 3,034,062

DELAY LINE CIRCUITS

Filed Sept. 13, 1956 3 Sheets-Sheet 3

INVENTOR.
Howard A. Bleam
BY Donald W. Phillion
HIS ATTORNEY

United States Patent Office 3,034,062

Patented May 8, 1962

3,034,062
DELAY LINE CIRCUITS

Howard A. Bleam, Chicago, Ill., assignor to Admiral Corporation, Chicago, Ill., a corporation of Delaware Filed Sept. 13, 1956, Ser. No. 609,636
10 Claims. (Cl. 328—56)

This invention relates, generally, to improvements in delay lines, and more particularly to delay line means constructed so that, in response to a single input pulse, both positive and negative output pulses can be obtained simultaneously from a single output means.

In certain applications of delay lines it is desirable that the delay line be capable of producing simultaneously, and from a single output means, a positive signal or pulse and a negative signal or pulse in response to a single unidirectional input pulse. For example, such structure is useful in pulse train decoding. More specifically, the decoding of a train of pulses sometimes is accomplished by first translating the train of pulses from a series-arrangement into a parallel-arrangement by means of a delay line having a plurality of output means with the time delays therebetween corresponding to the time intervals between pulses. Thus each of the pulses in a train of pulses moving along the delay line simultaneously will move past an output means individual thereto. Now suppose it is desired to recognize only a particular combination of pulses and to exclude all other combinations. Such a function can be accomplished by causing the output means which are positioned to respond to superfluous pulses (should they exist) to produce output pulses of a polarity opposite that of the output pulses produced by said particular combination of pulses. The groups of pulses containing pulses of both positive and negative polarity are rejected by circuit means well known in the prior art.

Other uses for a delay line capable of simultaneously producing positive and negative pulses in response to an applied pulse occur when it is desired to supply pulses simultaneously to equipments which require oppositely poled pulses from a given pulse source.

No prior delay line structures are known which will produce simultaneously in response to a single input pulse, output pulses of opposite polarity from a single output position.

In the delay line structure applications discussed above, it is desirable that the delay time be reasonably accurate and that this accuracy be maintained with age and use. Such accuracy can be so maintained through the use of variable delay lines, which can be adjusted to compensate for changes in operating characteristics. Further, in a more general sense, it is desirable that delay line structures be variable so that they can be adjusted to perform different functions.

An object of the present invention is to provide a delay line structure for producing simultaneously a positive and a negative pulse in response to a single pulse supplied thereto.

Another object of the invention is to provide a reliable and inexpensive delay line structure for producing simultaneously positive and negative signal outputs from a single tap position.

Another aim of the invention is to provide a variable delay line which will produce simultaneously, positive and negative pulses from a single tap position, in response to a single input pulse.

A further object of the invention is the improvement of delay lines, generally.

In accordance with the invention, there is provided in combination with a delay line of the type employing at least one output winding inductively coupled thereto, an impedance connected across said output winding and having the center point thereon tapped to a reference potential such as ground potential. Means are provided for supplying input signals to said delay line. First circuit means are provided for deriving output signals of a first polarity from one end terminal of the output winding and second circuit means are provided for deriving output signals of a second polarity from the other end terminal of the output winding.

In accordance with a feature of the invention, the said first circuit means can comprise a first asymmetrical device and the second circuit means can comprise a second asymmetrical device. The asymmetrical devices are poled so that the anode of one asymmetrical device is connected to the cathode of the other asymmetrical device through said impedance.

In accordance with another feature of the invention, the tap of the impedance may be positioned at points other than the center thereof, thus providing for oppositely poled pulses of different ratios of magnitude.

In accordance with a further feature of the invention, there can be several output windings on the delay line, each of which may be constructed and arranged to be moved along the delay line to provide variations in the time delays of output signals induced therein.

These and other features and objects of the invention will be more fully understood from the following detailed description thereof when read in conjunction with the drawings, in which.

Figures 6, 6A:
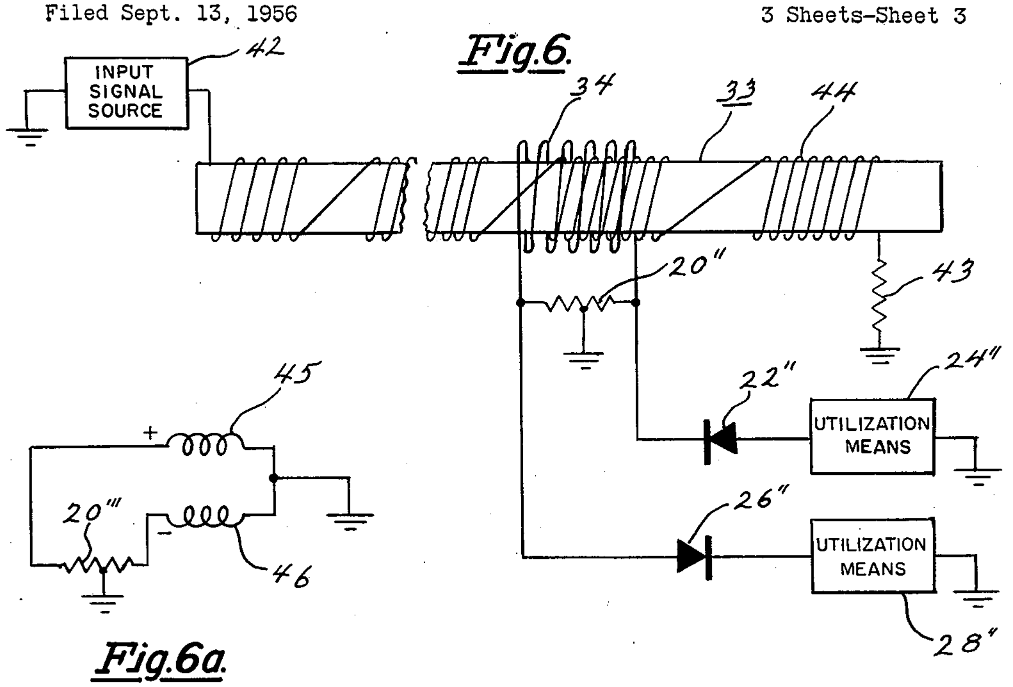
FIG. 6 is a sketch of another form of the invention.
Figure 7:
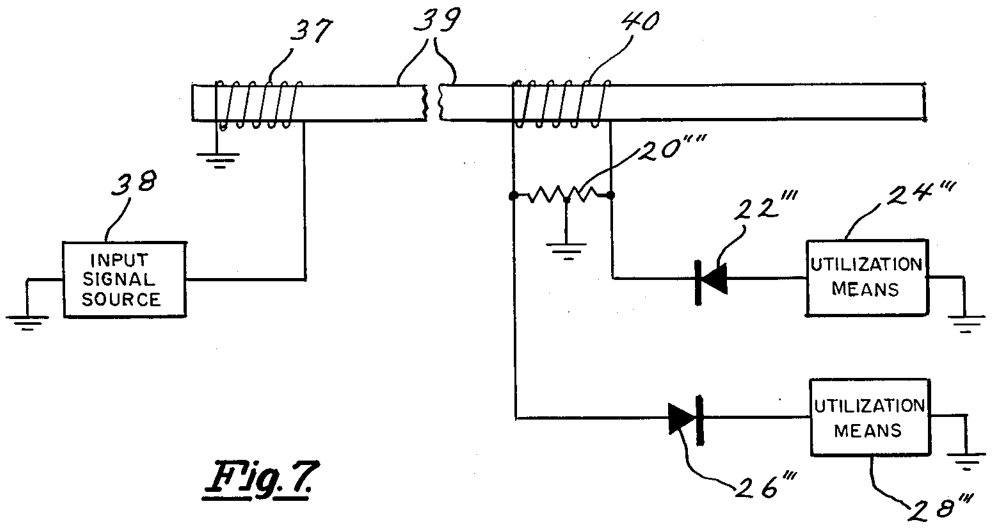

FIG. 6*a* illustrates a modification of the form of the invention shown in FIG. 6; and FIG. 7 is a sketch of a third form of the invention.

It is to be noted that the present invention can be employed generally in any type delay line which utilizes an output winding inductively coupled to the delay line. Included in this category are, for example, continuously wound electromagnetic-type delay lines, lumped constant-type delay lines, and magnetostrictive-type delay lines.

Figure 1:
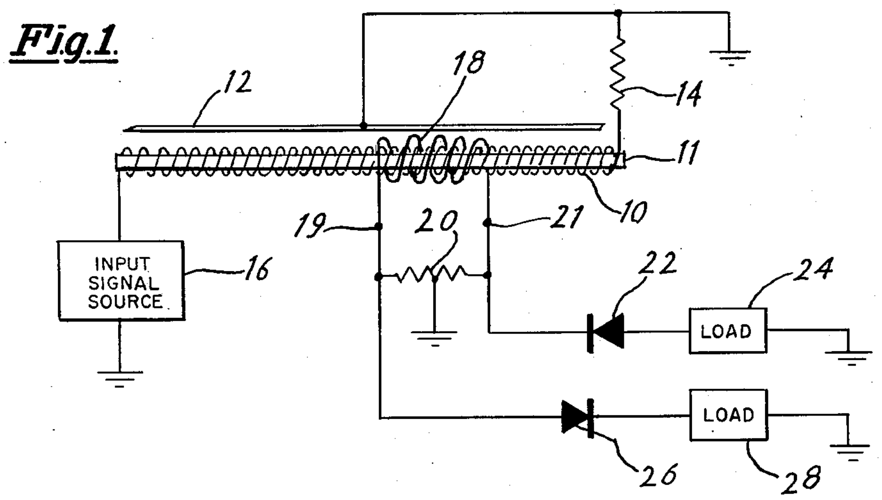
FIG. 1 is a schematic sketch of a form of the invention.

Referring now to FIG. 1, there is shown a form of the invention employing a continuously wound electromagnetic delay line. A winding or coil 10 consisting of a large number of closely wound turns is wound upon an elongated insulator 11. Pulses are supplied to one end terminal of the winding 10 from the input signal source 16 and travel along the winding 10 through the impedance matching resistor 14 to ground potential. Metal strip 12 is positioned adjacent the winding 10 and functions to provide a distributed capacitance along the length of the winding. The impedance looking into the winding 10 from the signal source 16 approximates the impedance of a transmission line.

Figure 3:
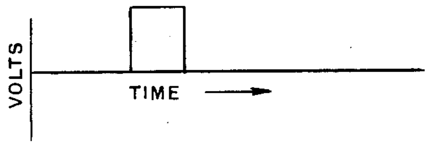
FIG. 3 shows a waveform of a representative input pulse supplied to the input of the delay line.
Figure 4:
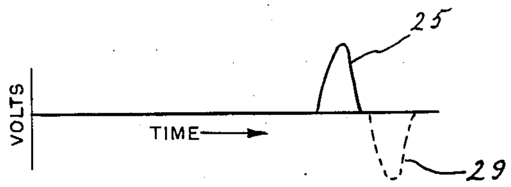
FIGS. 4 and 5 show waveforms of output pulses produced by the delay line in response to the input pulse of FIG. 3.
Figure 5:
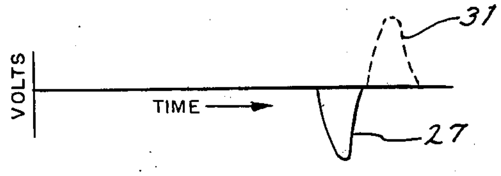

The output winding 18 (also referred to herein as a pickup coil) which consists of a number of closely wound turns inductively coupled to the winding 10, is positioned around the winding 10 and is arranged so that it can be moved along the winding 10 to vary the time delay produced in the signals induced therein. The resistor 20 is connected across the end terminals of the pickup coil 18 with a point thereon such as the center point tapped to ground potential, thus providing for the production of simultaneous pulses of opposite polarity at opposite end terminals of the coil 18. This can be seen more clearly from the curves of FIGS. 3, 4, and 5, of which the curve of FIG. 3 represents the waveform of a representative input signal supplied to delay line, the curve of FIG. 4 represents the waveform of the signal appearing at the end terminal 19 of the winding 18, and the curve of FIG. 5 represents the waveform of the signal appearing at the end terminal 21 of the winding 18. All of the curves of FIGS. 3, 4, and 5 employ the same time scale along their abscissas. The rectifiers 22 and 26, it will be observed, are connected so that the rectifier 22 will conduct only negative pulses and the rectifier 26 will conduct only positive pulses. Thus the signals represented by the broken line portions 29 and 31 of the waveforms of FIGS. 4 and 5 will not be conducted through the rectifiers 22 and 26 and, consequently, will not be supplied to the utilization means 24 or 28. Only the signals represented by the solid line portions 25 and 27 of the waveforms of FIGS. 4 and 5 will be supplied to the utilization means 24 and 28. It can be seen from the curves of FIGS. 4 and 5 that the pulses supplied to the loads 24 and 28 occur simultaneously and are of opposite polarity.

Figure 2:
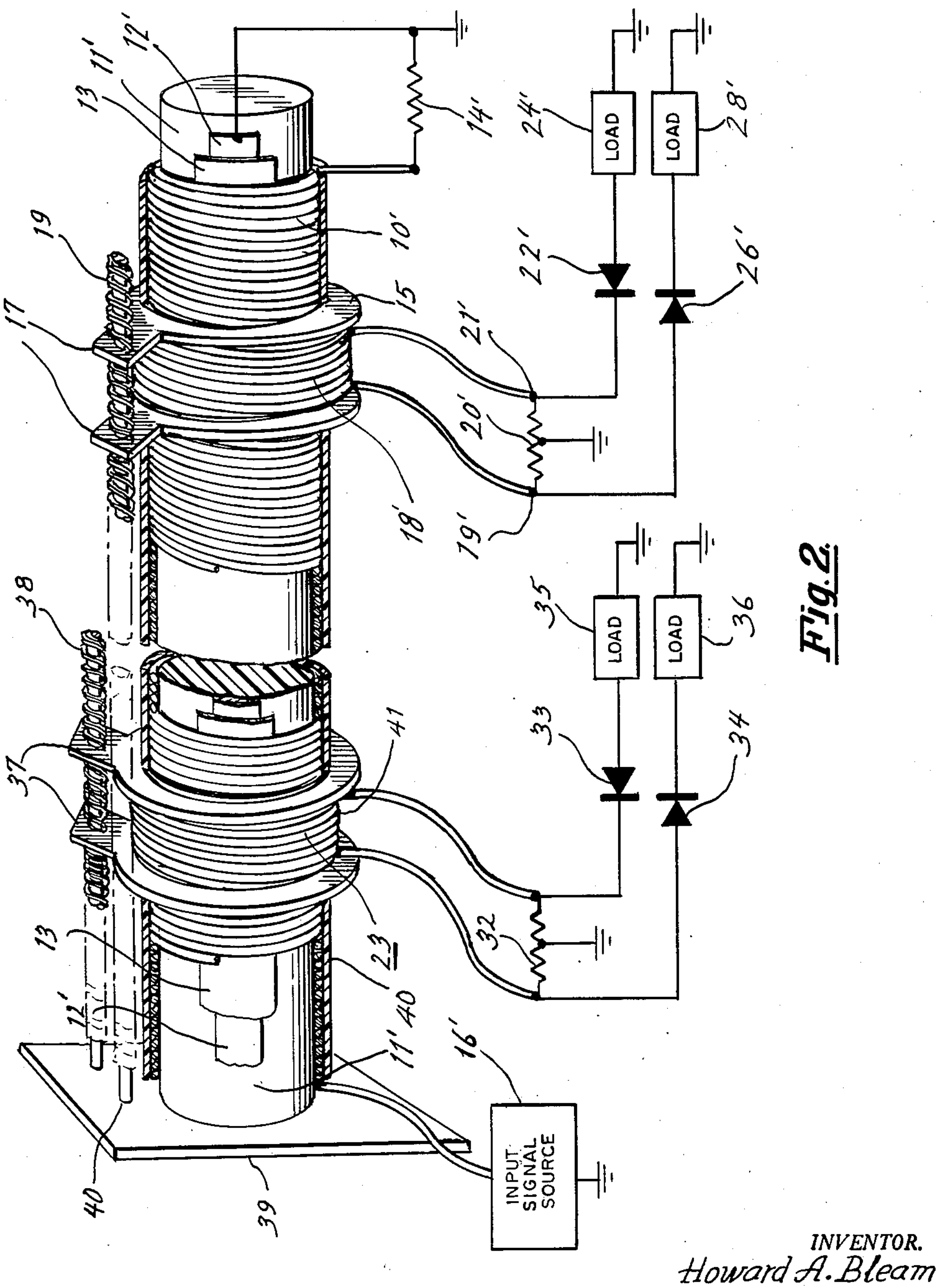
FIG. 2 is a combination schematic sketch and perspective view of the form of the invention shown in FIG. 1.

Referring now to FIG. 2, there is shown the construction of a specific form of the invention shown schematically in FIG. 1. Many of the elements of FIG. 2 have corresponding elements in FIG. 1. These corresponding elements are given similar reference characters (primed in FIG. 2). More specifically, in FIG. 2 input signal source 16′, elongated insulating core 11′, winding 10′, conductive strip 12′, pickup winding 18′ having end terminals 19′ and 21′, resistor 20′, rectifiers 22′ and 26′, loads 24′ and 28′, and resistor 14′ have corresponding elements in FIG. 1. In addition, the structure of FIG. 2 comprises a sheet of insulating material 13 which is employed to insulate the conductive strip 12′ from the winding 10′. A cylindrically shaped insulating member 40 may be employed to protect the winding 10′. The pickup winding 18′ is wound upon a bracket 15 which fits around the winding 10′ and which can be moved along the winding 10′. The bracket 15 has two lips 17 thereon which have threaded holes therein. A threaded member 19 can be employed to adjust the position of the pickup winding 18′ along the winding 10′ to vary the amount of the time delay of the pulse induced in the winding 18′. One end of the threaded member 19 is mounted in the bracket 39 through an aperture 40 in such a manner that the threaded member is rotatable but cannot move transversely. The bracket 39 is secured to the insulator rod 11′.

If desired, more than one output winding constructed to produce simultaneous positive and negative output pulses in response to a single input pulse may be employed. For example, output winding assembly 23 may be employed in addition to the output assembly including output winding 18′. Other output winding assemblies also may be added.

The elements of the pickup winding assembly 23 correspond to various elements of the assembly which includes the output winding 18′. More specifically, resistor 32 corresponds to resistor 20′, asymmetrical devices 33 and 34 correspond to asymmetrical devices 22′ and 26′, and loads 35 and 36 correspond to loads 24′ and 28′. The lips 37 of the assembly 23 are offset with respect to the lips 17 of spool-like element 15 so that the threaded adjusting element 38 will not interfere with the threaded adjusting element 19.

Referring now to FIG. 6, there is shown a form of the invention employing a lumped constant-type delay line, represented generally by the reference character 33 and comprising a winding 44. Input signal source 42 supplies input signals to the end terminal of the winding 44. The other end terminal is terminated in impedance matching resistor 43. Output winding 34, which is inductively coupled to the delay line 33, may be arranged therearound on a spool (not shown), for example, to enable the moving of the winding 34 along the delay line 33. Tapped impedance 20″, which is connected across the winding 34, asymmetrical devices 22″ and 26″, and loads 24″ and 28″, perform the same function as the corresponding elements identified by similar reference characters (unprimed) in FIG. 1.

In operation, signals are supplied to the delay line 33 from the input signal source 42. Output signals are induced in the output winding 34 to produce simultaneous output pulses of opposite polarity thereacross in the same manner as described in connection with FIG. 1.

If desired, the winding 34 may be comprised of two windings, such as the windings 45 and 46 shown in FIG. 6*a*. The two windings 45 and 46 are connected in series-arrangement and are wound around the delay line, one over the other, in such directions that voltages of opposing polarities are induced therein. The junction therebetween can be connected to ground potential and, in response to an input signal supplied to the delay line, output signals of opposite polarity will appear at the other ends of the two windings. Such an arrangement provides improved performance over the case where a single output winding is employed.

This improved performance is due to the fact that in the case of a single winding, there is the possibility of a small difference in time between the occurrence of output signals at the two end terminals thereof, owing to the slight inherent time delay in the output winding itself. If two output windings are employed, wound in the manner described above, an inherent time delay in one of the output windings will be cancelled by an equal inherent time delay in the other. It is to be noted that the modification shown in FIG. 6*a* is applicable also to the structures of FIGS. 1 and 7.

In FIG. 7 there is shown a form of the invention in which a magnetostrictive-type delay line is employed. The input signal is supplied to the input winding 37 from the input signal source 38. A sound wave is thereby generated in the rod 39 which is of magnetostrictive material. This sound wave travels along the rod 39 and is detected by the output winding 40.

The tapped resistor 20‴, which is connected across the winding 40, asymmetrical devices 22‴ and 26‴, and loads 24‴ and 28‴, perform the same function as corresponding elements in the circuit of FIG. 1, which have the same reference characters (unprimed).

It is to be noted that the forms of the invention herein shown and described are but preferred embodiments thereof, and that various changes may be made in the circuit arrangement and the construction thereof without departing from the spirit or scope of the invention.

I claim:

1. In combination with an electromagnetic delay line comprising an elongated core of insulating material, first winding means having a large number of closely wound turns wound on said elongated core, a conductive strip insulated from but positioned along said winding to produce a distributed capacitance along said winding means, and means for supplying pulsating signals to said first winding means, secondary winding means comprising a small number of closely wound turns compared to the number of turns of said first winding means, said secondary winding means being positioned around said first winding means, means for moving said secondary winding along said first winding means, impedance means connected across said secondary winding means and having a point thereon tapped to a reference potential, means comprising first rectifier means for deriving a first pulsating output signal from a first end terminal of said secondary winding means, and means comprising a second rectifier means for deriving a second pulsating output signal from the second end terminal of said secondary winding means, the cathode of said first rectifier means being connected to the anode of said second rectifier means through said impedance means.

2. In combination with an electromagnetic delay line comprising a first winding means having a large number of closely wound turns, means for producing a distributed capacitance along said first winding means, and means for supplying pulsating signals to said first winding means, a spool-like element constructed to fit around said first winding means and having an axial length small compared to the length of said first winding means, secondary winding means wound around said spool-like element and comprising a small number of closely wound turns with respect to the number of turns of said first winding means, means for moving said spool-like element with respect to said first winding means, impedance means connected across said secondary winding means and having a point thereon tapped to a reference potential, means for deriving a pulsating first output signal of a first polarity from a first end terminal of said secondary winding means, and means for deriving a second pulsating output signal of a second polarity from the second end terminal of said secondary winding means.

3. In combination with an electromagnetic delay line comprising a first winding means having a large number of closely wound turns, means for producing a distributed capacitance along said first winding means, and means for supplying pulsating signals to said first winding means, a spool-like element constructed to fit around said first winding means and having an axial length small compared to the length of said first winding means, secondary winding means wound around said spool-like element and comprising a small number of closely wound turns with respect to the number of turns of said first winding means, means for moving said spool-like element with respect to said first winding means, impedance means connected across said secondary winding and having a point thereon tapped to a reference potential, means comprising first rectifier means for deriving a first pulsating output signal from a first end terminal of said secondary winding means, and means comprising second rectifier means for deriving a second pulsating output signal from the second end terminal of said secondary winding means, the cathode of said first rectifier means being connected to the anode of said second rectifier means through said impedance means.

4. A combination in accordance with claim 3, in which said secondary winding means comprises a third winding and a fourth winding, said fourth winding being wound over said third winding such that voltages of opposing polarities are induced in physically corresponding end terminals of said third winding and said fourth winding in response to an input signal supplied to said first winding means, one set of the physically corresponding end terminals of said third and fourth windings being connected to a common reference potential, the other set of physically corresponding end terminals of said third and fourth windings being connected across said impedance means.

5. In combination with a delay line of the lumped constant type and means for supplying pulsating signals to said delay line, at least one output winding inductively coupled to a small portion of said delay line, means for moving said output winding along said delay line, impedance means connected across said output winding and having a point thereon connected to a reference potential, means for deriving pulsating output signals of a first polarity with respect to said reference potential from a first end terminal of said output winding, and means for deriving pulsating output signals of a second polarity with respect to said reference potential from the second end terminal of said winding.

6. A combination in accordance with claim 5, in which said means for deriving pulsating output signals of a first polarity from a first end terminal of said output winding comprises a first asymmetrical device having a cathode and an anode and in which said means for deriving pulsating output signals of a second polarity from the second end terminal of said output winding comprises a second asymmetrical device having a cathode and an anode, the cathode of said first asymmetrical device being connected to the anode of said second asymmetrical device through said impedance means.

7. A combination in accordance with claim 5, in which said output winding comprises a second winding and a third winding, said third winding being wound over said second winding such that voltages of opposing polarities are induced in physically corresponding end terminals of said second winding and said third winding, one set of the physically corresponding end terminals of said second and third windings being connected to a common reference potential, the other set of physically corresponding end terminals of said second and third windings being connected across said impedance means.

8. In combination with a delay line of the magnetostrictive type, means for supplying a pulsating signal to said delay line, at least one output winding inductively coupled to a small portion of said delay line, means for moving said output winding along said delay line, impedance means connected across said output winding and having a point thereon connected to a reference potential, means for deriving pulsating output signals of a first polarity with respect to said reference potential from a first end terminal of said output winding, and means for deriving pulsating output signals of a second polarity with respect to said reference potential from the second end terminal of said output winding.

9. A combination in accordance with claim 8, in which said means for deriving pulsating output signals of a first polarity from a first end terminal of said output winding comprises a first asymmetrical device having a cathode and an anode and in which said means for deriving pulsating output signals of a second polarity from the second end terminal of said output winding comprises a second asymmetrical device having a cathode and an anode, the cathode of said first asymmetrical device being connected to the anode of said second asymmetrical device through said impedance means.

10. A combination in accordance with claim 8, in which said output winding comprises a second winding and a third winding, said third winding being wound over said second winding such that voltages of opposing polarities are induced in physically corresponding end terminals of said second winding and said third winding, one set of the physically corresponding end terminals of said second and third windings being connected to a common reference potential, the other set of physically corresponding end terminals of said second and third windings being connected across said impedance means.

References Cited in the file of this patent

UNITED STATES PATENTS

| | | |
|---|---|---|
| 1,456,909 | Pupin | May 29, 1923 |
| 2,113,148 | Weber | Apr. 5, 1938 |
| 2,540,560 | Wheeler | Feb. 6, 1951 |
| 2,611,025 | Jankowski | Sept. 16, 1952 |
| 2,632,847 | Reed | Mar. 24, 1953 |
| 2,679,040 | Gloess | May 18, 1954 |
| 2,854,658 | Jones | Sept. 30, 1958 |
| 2,914,672 | Powell | Nov. 24, 1959 |

FOREIGN PATENTS

| | | |
|---|---|---|
| 104,213 | Sweden | Feb. 5, 1942 |

OTHER REFERENCES

"Applied Electronics," by T. S. Gray, 2nd Ed., published by Wiley & Sons, 1954 (pp. 783–84).